March 3, 1942.  B. J. DENNISON  2,274,672
SAFETY GLASS
Filed April 30, 1938
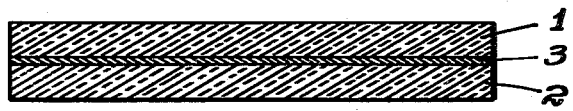
INVENTOR.
BROOK J. DENNISON
BY Bradley & Bee
ATTORNEYS.

Patented Mar. 3, 1942

2,274,672

UNITED STATES PATENT OFFICE 2,274,672

SAFETY GLASS

Brook J. Dennison, Aspinwall, Pa., assignor to Pittsburgh Plate Glass Company, Allegheny County, Pa., a corporation of Pennsylvania Application April 30, 1938, Serial No. 205,270

4 Claims. (Cl. 49—81.5)

The present invention relates to laminated articles and more particularly to safety glass in which a pair of glass sheets are adhered to the opposite sides of a sheet of reinforcing material.

The primary object of the present invention is the provision of a new class of plasticizers for the reinforcing inner layer material of safety glass which will enable the preparation of laminated plates having great resistance to shattering over a wide temperature range and which will insure a product meeting in every way the other requirements of safety glass for commercial application.

Other objects and advantages of my invention will become more apparent from the following detailed description of certain embodiments thereof.

It is well known that the difficulty in producing safety glass of high quality resides in the physical limitations of the plastic material used as the reinforcing layer therein. Research chemists have provided many thermo plastics for use in safety glass including cellulosic compounds, acrylates, vinyl esters, vinyl acetals and other synthetic resins but they all require the incorporation of modifying agents or plasticizers in order to render them satisfactory as reinforcing agents for laminated glass.

It will at once be obvious that safety glass is exposed to a wide range of temperatures, varying from about 20 degrees below zero to 120 degrees above, and it is necessary that the laminated plates possess a good resistance to breaking over this entire temperature range. The plasticity of the reinforcing material, by which this resistance to breaking is insured, is governed to a great extent by the nature and quantity of the plasticizers incorporated therewith. It is well known however that in many cases when a plasticizer is added to the reinforcing material to increase the strength of a laminated plate containing such reinforcing material at low temperatures, the plate will be weakened at high temperatures. The converse of this proposition is also true, that is a laminated plate may be prepared which has a strong resistance to breaking at high temperatures but which is weak at low temperatures.

Briefly stated, the present invention contemplates the use of an octoic acid ester of triethylene glycol as the plasticizer for a synthetic plastic material by means of which the plastic may be modified and a laminated plate embodying such plastic will have a high resistance to breaking both at low and high temperatures. It is also contemplated to use the particular plasticizers in combination with other plasticizers of a similar nature in order to produce a greater variety of effects in the physical characteristics of the modified resinous material.

One embodiment of the invention is illustrated in the accompanying drawing, wherein:

The figure is a sectional view through a laminated plate embodying my inventive provisions.

In the drawing, glass sheets or plates 1 and 2 are adhered to the opposite faces of a sheet 3 of the improved reinforcing material to which the invention particularly relates. The various elements of the drawing have been exaggerated and are out of proportion for clearness of illustration.

The plastic forming the base of the sheet 3 of reinforcing material is preferably a polymerized incomplete vinyl acetal substantially equivalent to that produced by treating 2½ to 8 moles of polyvinyl alcohol with 1 mole of a straight chain saturated aliphatic aldehyde, such as butyraldehyde. The preparation of this resin is well known to the art and need not be described in greater detail here. Other plastics may be used in lieu of the vinyl acetal resin and when plasticized with the disclosed class of modifying agents will admit of the production of a superior laminated safety glass. In the following description, therefore, where reference is made to a vinyl acetal resin, it will be understood that the remarks will apply equally as well to cellulose nitrate, ethyl cellulose, methyl acrylate, ethyl acrylate, methyl methacrylate, ethyl methacrylate, vinyl acetal and vinyl chloracetate which are thermoplastic compounds adapted particularly for use in the manufacture of safety glass.

It has been found that the octoic acid esters of triethylene glycol or admixtures thereof alone or with other plasticizers when used to plasticize the vinyl acetal resin, so modify that resin that safety glass including a layer thereof has a superior resistance to breaking and a greater mechanical strength over the prescribed wide temperature range than safety glass containing as the interlayer resins which have been plasticized with one of the several modifying agents commonly employed.

The alcohol constituent of the plasticizing ester is triethylene glycol.

The alcohol is esterified with an octoic acid, either in normal or isomeric form. The following examples are illustrative of a few of the plasticizing compounds as contemplated by the invention:

Example 1.—Triethylene glycol di octoate

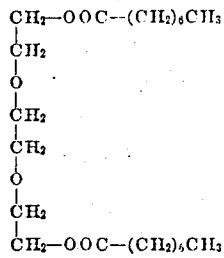

Example 2.—Triethylene glycol di octoate (triethylene glycol ester of 2-ethyl hexanoic acid)

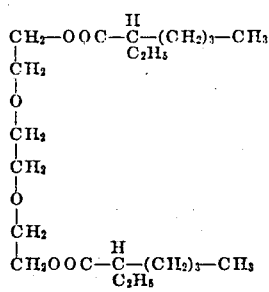

Example 3.—Tri ethylene glycol dioctoate (triethylene glycol di-ester of 2-2 dimethyl hexanoic acid)

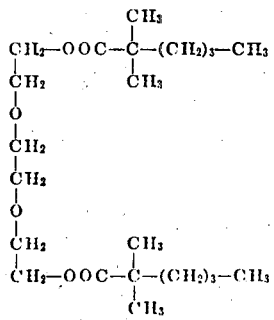

Other isomers of octoic acid may be used in lieu of the specific examples given above to produce plasticizers having the same general modifying effect upon the vinyl acetal resin.

The amount of plasticizer incorporated with the resin may be varied through a range of from 25 to 45 per cent depending to some extent upon the physical characteristics which it is desired to impart to the resin and therethrough to the laminated glass plates. Large percentages of plasticizer render the reinforcing interlayer soft and consequently affect the break tests at high temperatures. Low percentages of plasticizer leave the interlayer relatively hard and brittle affecting the break tests at low temperatures.

It is preferred, therefore, in using one or more of the octoic acid esters of tri ethylene glycol that the plasticizer content will be approximately 32 per cent by weight of the total mix of plasticizer and resin.

Tri ethylene glycol dioctoate may be used in combination with other similar plasticizers, as for example tri ethylene glycol dihexoate to good advantage. The ratio between the mixed plasticizers may vary within wide limits and equally good effects are derived when either constituent predominates. Typical mixtures comprise:

|  | Per cent |
|---|---|
| (1) Triethylene glycol dioctoate | 28 |
| Triethylene glycol dihexoate | 72 |
| (2) Triethylene glycol dioctoate | 50 |
| Triethylene glycol dihexoate | 50 |
| (3) Triethylene glycol dioctoate | 65 |
| Triethylene glycol dihexoate | 35 |

It has been found that most satisfactory results arise from a mixture having the percentage composition of Example 1 approximately 35 per cent by weight of the total mix of plasticizer and resin.

The particular plasticizing agents set forth above may be prepared from the esterification of triethylene glycol with an acid or mixture of acids containing 8 carbon atoms, such as normal octoic acid, 2 ethyl hexanoic acid, 2-2 dimethyl hexanoic acid and other isomers of octoic acid.

The plasticizer may be incorporated with the vinyl acetal resin by any suitable means and the plasticized resin is then formed into sheets, for example, by extruding the mixture under pressure. The laminating operation is preferably similar to that disclosed in the Sherts and Hamill Patent No. 1,781,084, wherein the separate laminae are assembled, pressed and then subjected to heat and pressure in an autoclave to complete the lamination. A fluid pressure of approximately 150 pounds per square inch at a temperature of approximately 225 degrees F. has been found satisfactory for the instant process. It is to be observed, however, that with the present material no additional cement is required to affect a strong, permanent bond between the glass and resin interlayer.

The improved interlayer material is particularly adapted to impart a greater resistance to breakage to safety glass containing the plasticized resin both at high and low temperatures. The standard break test as known and practised by those skilled in the art was utilized in numerous tests and proved conclusively the greater strength of laminated glass in which the resin layer was plasticized with the compounds included herein in the amounts contemplated. For example, a laminated plate containing a polymerized incomplete vinyl acetal resin plasticized with triethylene glycol dioctoate as the reinforcing interlayer will withstand the impact of a ½ pound ball dropping 50 feet without shattering when the plate is at a temperature of 120 degrees F. Although the glass is fractured, the fragments thereof remain adhered to the reinforcing interlayer and do not scatter. This feature is also observed at zero degrees F. under similar conditions. Other breaks on laminated plates, the reinforcing resin interlayers of which contained different plasticizers and especially the mixture of triethylene glycol dioctoate and triethylene glycol dihexoate were of the same magnitude.

The resistance to breakage of laminated plates formed in accordance with the provisions of my invention, therefore, affords a high safety factor over a wide temperature range which has never before been approached. Accordingly the use of this improved safety glass in automobiles and commercial vehicles will afford a new and greater measure of protection to the passengers therein.

It is to be understood that the advantages accredited to my improved product are obtained without sacrificing any of the other requirements of commercially acceptable laminated glass. The adhesion, durability, and resistance to moisture of the laminated plates is retained at the maximum.

It will be obvious that various modifications may be resorted to and different embodiments had without departing from the spirit of my invention or the scope of the appended claims.

What I claim is:

1. A laminated plate comprising a pair of glass sheets adhered to the opposite sides of a sheet of polymerized incomplete vinyl acetal resin containing approximately 32 per cent by weight of tri ethylene glycol dioctoate as a plasticizer.

2. A laminated plate comprising a pair of glass sheets adhered to the opposite sides of a sheet of polymerized incomplete vinyl acetal resin substantially equivalent to that obtained by treating from 2½ to 8 moles of polyvinyl alcohol with 1 mole of butyraldehyde, the resin containing approximately 32 per cent by weight of triethylene glycol dioctoate as a plasticizer.

3. A laminated plate comprising a pair of glass sheets adhered to the opposite sides of a sheet of polymerized incomplete vinyl acetal resin substantially equivalent to that obtained by treating from 2½ to 8 moles of polyvinyl alcohol with 1 mole of butyraldehyde, the resin containing approximately 32 per cent by weight of a plurality of plasticizers at least one of which is tri ethylene glycol dioctoate.

4. A laminated plate comprising a pair of glass sheets adhered to the opposite sides of a sheet of polymerized incomplete vinyl acetal resin substantially equivalent to that obtained by treating from 2½ to 8 moles of polyvinyl alcohol with 1 mole of butyraldehyde, the resin containing approximately 32 per cent by weight of a mixed plasticizer, the major constituent of which is the normal octoic acid ester of tri ethylene glycol.

BROOK J. DENNISON.